C. H. SMITH.
BRACKET.
APPLICATION FILED APR. 17, 1909.
990,399.
Patented Apr. 25, 1911.
2 SHEETS—SHEET 2.
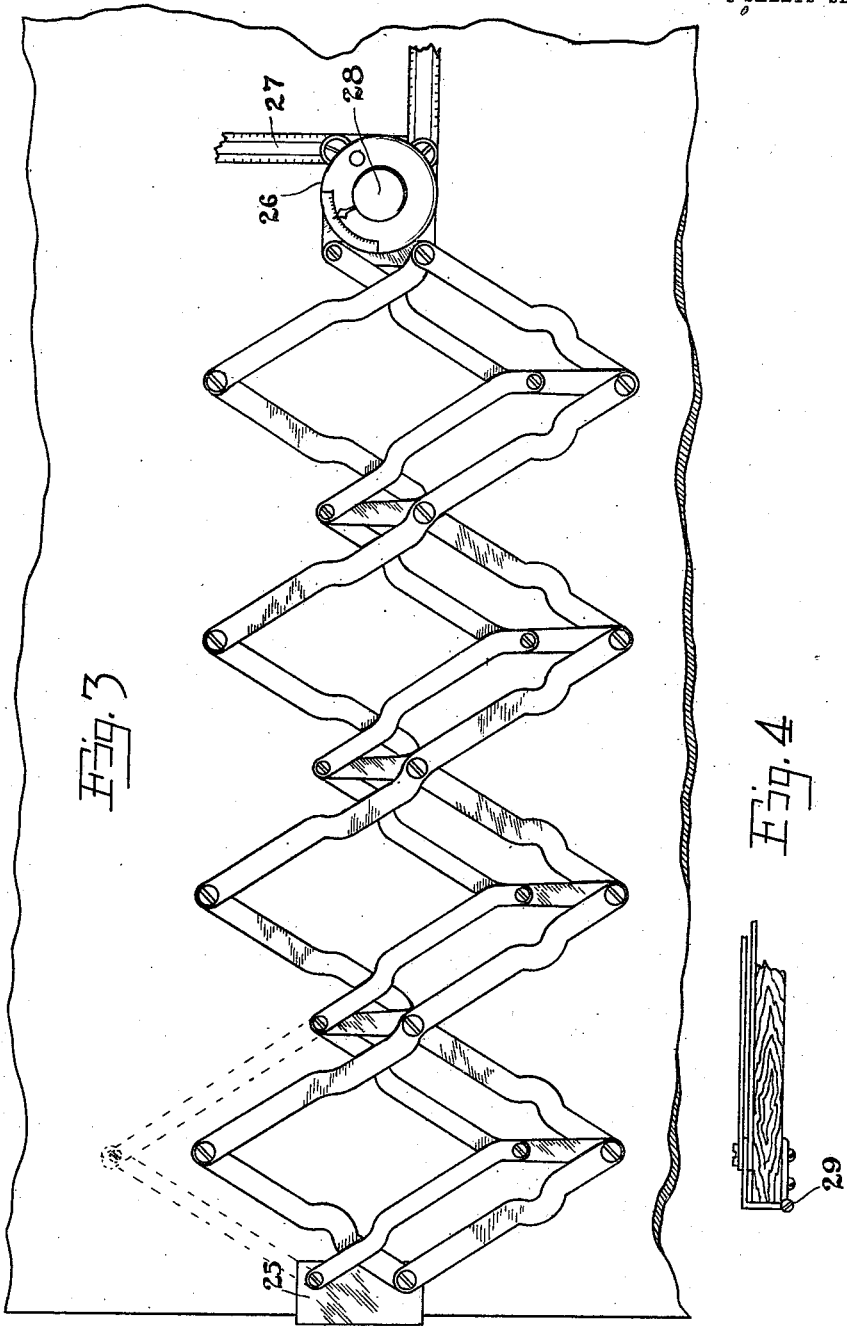
Witnesses
D. E. Hadley
M. E. Grier
Charles H. Smith
Inventor
By Clifford C. Bradbury
Attorney

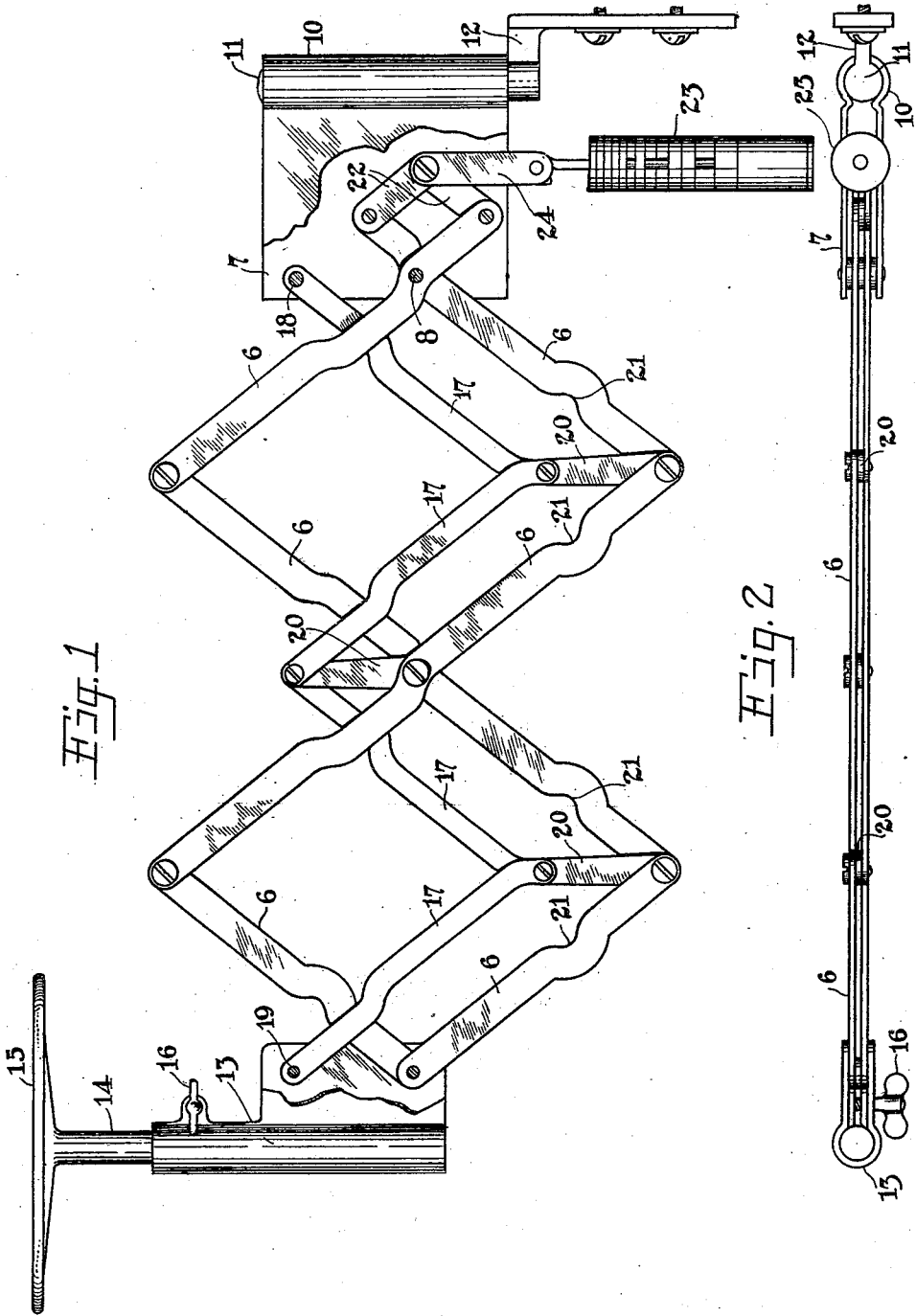

UNITED STATES PATENT OFFICE.

CHARLES H. SMITH, OF CHICAGO, ILLINOIS.

BRACKET.

990,399.

Specification of Letters Patent. Patented Apr. 25, 1911.

Application filed April 17, 1909. Serial No. 490,457.

*To all whom it may concern:*

Be it known that I, CHARLES H. SMITH, a citizen of the United States, residing in Chicago, county of Cook, and State of Illinois, have invented certain new and useful Improvements in Brackets, of which the following is a specification.

This invention relates to extensible brackets, particularly those used for supporting dental appliances, telephones, drop lights, and the like, where it may be desirable to provide a bracket having a member at its movable end which retains a constant angular position for all of the various positions into which the bracket may be moved. The invention is also applicable to drafting or pantograph purposes where it is desirable to maintain the constant angular position of a ruler or straight edge and to permit it to be moved to any position upon the surface of the drafting board. The invention is capable of many other uses such as the support of carving and drilling tools and such other devices as it is necessary to support in a given direction and at the same time to move as a whole into any position.

The invention comprises particularly the familiar lazy tongs arrangement in combination with new and improved means for maintaining the parallelism of the fixed and movable parts of the bracket, or in other words, maintaining the object upon the movable end of the bracket in a fixed angular direction for all adjustments of the bracket.

The invention is more particularly set forth in the following description and claims.

The invention is illustrated in the accompanying drawings, in which—

Figure 1 is a side elevation of a supporting bracket in a partially extended position; Fig. 2 is a plan view of the same bracket; Fig. 3 is a plan view of a bracket as applied to drafting purposes, and Fig. 4 is a sectional detail showing the method of attaching the bracket to the edge of the drafting board.

In the drawing the members 6 of a lazy tongs construction are pivoted together in the usual manner to form a bracket which may be expanded or retracted and also inclined at various angles to the horizontal. At the attaching end these members 6 are pivotally supported between the cheeks 7 of a sheet metal supporting member by means of the transversely extending pivot 8. The supporting member is bent to form a sleeve 10 which is fitted over a pin 11 on any suitable kind of fixture 12, forming a pivotal support about which the bracket may be swung horizontally.

At the outer end of the lazy tongs is a clamp or holder 13 which may be of any desired construction according to the device to be supported. In the illustrated embodiment this holder is of similar construction to the supporting member and is provided with a sleeve which surrounds the rod 14 for supporting the table 15. This sleeve is provided with the thumb screw 16 for securely clamping the rod 14 if desired.

The constant angular position of the table in all positions of the bracket is maintained by means of a set of supplemental links 17 which are pivoted at their ends and extend in parallelism to members 6 of the lazy tongs. At one end of the bracket the set of supplemental links is pivotally connected by means of a transverse pivot 18 between the cheeks 7 of the supporting member, and at the other end of the bracket the supplemental links are pivoted by means of transverse pivot 19 to the holding device 13. At each connecting point of the lower half of the lazy tongs the supplemental links are connected to the members of the lazy tongs by short links 20, the pivots employed to connect the members of the lazy tongs together being also used to connect the short links as shown.

In order to permit the bracket to be extended and retracted to the greatest extent possible and still maintain the supplemental links in the same plane as the members of the lazy tongs the members of the lazy tongs are concaved at the point 21 and the links 17 are made somewhat bowed in order that the pivotal points may when the device is either extended or collapsed approach as near as possible to the straight line between pivots.

As stated the supplemental links 17 are maintained in parallelism to the members of the lazy tongs in all positions of the bracket, the distance between pivot centers of both being equal. Likewise the short links 20 are maintained in parallelism with the line of centers between the pivots of the supporting member, the distance between these centers being also the same for the short links and the supporting and supported members. Thus, through any and all positions of expansion, contraction or angular movement of the bracket as a whole, the supported member or holder 13 is maintained in a fixed and constant position.

For brackets such as are used in dental offices it is desirable that the movable end may be changed from one position to another without a great deal of effort and to accomplish this a counterbalancing means may be applied, though for small brackets sufficient friction may be produced to hold the bracket in the desired position by means of the pivots which may have thumb screws applied thereto if desired.

In Fig. 1 is illustrated one method of counterbalancing the weight of the bracket and the objects supported thereby. In accordance with this method the rear links are extended beyond their supporting pivots and have their ends connected by means of the links 22 which are pivoted together and support the adjustable weight 23 by means of the link 24. With this construction, the weight when adjusted to balance the bracket in one position will balance it in every position, the movement of the weight being such as to maintain its moment about the pivot 8 equal to the moment of the bracket and the object carried thereby about the pivot 8. It is to be understood, however, that other balancing means may be provided such as springs, which are considered, when properly applied for this purpose, to be the mechanical equivalent of weights.

In Fig. 3 a similar bracket is shown applied to a drafting board, one end being attached thereto by means of the hinged member 25, and the other end carrying a protractor 26 to which the ruler or straight edge 27 is attached in such manner as to permit its being moved to and secured in any desired angular position about the pivot 28. When it is desired to use the drafting board with an ordinary T-square the bracket may be swung about the pivot or hinge 29 and allowed to hang down at the side of the drafting table. The hinged member 25 is so arranged as to leave the end of the drafting board free for the use of the T-square when the bracket is not in use.

The same result, that of maintaining the movable end of the bracket in a constant angular position for all positions of the bracket, may be accomplished by means of several variations of the present invention, one of which is to use two separate sets of lazy tongs connected at the two ends and at an intermediate point by means of equal length links. This particular method is illustrated by dotted lines in the first section of the bracket of Fig. 3.

I, therefore, do not wish to be limited to the specific structures here shown, various modifications being possible without departing from the spirit or scope of my invention.

I claim:

1. In an extensible bracket, the combination with a lazy tongs structure having attaching and supporting members at opposite ends, of a series of links pivotally connected together and extending parallel to the levers of the lazy tongs, the length between the pivots of the links being equal to the distance between the pivots of the corresponding levers of the lazy tongs, and a second set of links connecting said pivots to each other to maintain the parallelism of the first links and the levers, substantially as described.

2. In an extensible bracket, the combination with lazy tongs having attaching and supporting members at opposite ends, of a series of links pivoted together, the links at the ends of the series being also pivoted to said members respectively, said links extending parallel to the members of the lazy tongs, and the distance between the pivots of the links being equal to the distance between the pivots of the lazy tongs, and short links connecting the pivots of the lazy tongs with the pivots of the links to maintain the parallelism of said parts, substantially as described.

3. In an extensible bracket, the combination with lazy tongs, of a supplemental structure having members extensible and parallel with one set of members of the lazy tongs, and links to maintain the parallelism of said members of the supplemental structure with said members of the lazy tongs, substantially as described.

4. In an extensible bracket, the combination with a lazy tongs, of a series of supplemental links pivoted together and extensible and parallel with one set of members of the lazy tongs, and connections between the links and the lazy tongs constructed to maintain the former in said parallelism, substantially as described.

5. In a bracket, the combination with the members of a lazy tongs pivotally attached at one end to a support, of a table carried upon the other end of the bracket, and means extending along the lazy tongs to positively maintain said table level during the movement of the bracket up and down about said pivot, substantially as described.

6. In a bracket, the combination with a set of main links pivoted together so as to form an extensible structure known as "lazy tongs," of a set of supplemental members connected by links to pivotal points of the main links and members at each end of the bracket pivotally connected to the main links and to the supplemental members and adapted to be moved to various distances from one another and to various angular positions about the pivots by which they are secured to the main links, the supplemental links being adapted to maintain the end members in a constant angular relation with one another, substantially as described.

7. In a lazy tongs structure, a stationary member to which one end of said lazy tongs is pivoted, a movable member pivoted to the other end of the lazy tongs, said pivots passing transversely to the plane of the members of the lazy tongs, and supplemental means for maintaining the constant angular direction of the latter member when the lazy tongs as a whole are swung about the pivot in the stationary member.

8. In a lazy tongs structure, the combination with a stationary member, a movable member, pivots extending transversely to the plane of the members of the lazy tongs and securing the opposite ends of the lazy tongs, respectively, to side members, articulated links extending throughout the length of the lazy tongs for holding the movable member in a constant angular position during the movement of the lazy tongs structure about the pivot in the stationary member.

Signed by me at Chicago, county of Cook, and State of Illinois, in the presence of two witnesses.

CHARLES H. SMITH.

Witnesses:
MARJORIE E. GRIER,
WM. LEAVER.

---

Copies of this patent may be obtained for five cents each, by addressing the "Commissioner of Patents, Washington, D. C."